US012776949B2

(12) United States Patent

Dande et al.

(10) Patent No.: US 12,776,949 B2

(45) Date of Patent: Oct. 27, 2026

(54) SYSTEM AND METHOD TO ORCHESTRATE ACCESS TO COMMUNICATION INFRASTRUCTURE

(71) Applicant: Bank of America Corporation, Charlotte, NC (US)

(72) Inventors: Pratap Dande, Saint Johns, FL (US); Naga Vamsi Krishna Akkapeddi, Charlotte, NC (US); Elvis Nyamwange, Fate, TX (US); Janardhan R Garlapati, Little Elm, TX (US)

(73) Assignee: Bank of America Corporation, Charlotte, NC (US)

( * ) Notice: Subject to any disclaimer, the term of this patent is extended or adjusted under 35 U.S.C. 154(b) by 6 days.

(21) Appl. No.: 19/174,773

(22) Filed: Apr. 9, 2025

(65) Prior Publication Data

US 2026/0322687 A1 Oct. 15, 2026

(51) Int. Cl.

| | |
|---|---|
| ***G06F 15/16*** | (2006.01) |
| ***G06F 9/54*** | (2006.01) |
| ***H04L 29/06*** | (2006.01) |
| ***H04L 41/0806*** | (2022.01) |
| ***H04L 41/16*** | (2022.01) |

(52) U.S. Cl.

CPC .......... *H04L 41/0806* (2013.01); *H04L 41/16* (2013.01)

(58) Field of Classification Search

CPC ............................ H04L 41/0806; H04L 41/16

USPC .......................................................... 709/223

See application file for complete search history.

(56) References Cited

U.S. PATENT DOCUMENTS

| | | | |
|---|---|---|---|
| 8,448,170 | B2 | 5/2013 | Wipfel et al. |
| 8,676,833 | B2 | 3/2014 | Chunilal |
| 10,057,742 | B2 | 8/2018 | Condeixa et al. |
| 10,187,811 | B2 | 1/2019 | Cummings |
| 10,225,245 | B2 | 3/2019 | Pace et al. |
| 10,660,144 | B2 | 5/2020 | Lopes et al. |
| 10,691,514 | B2 | 6/2020 | Mcclory et al. |
| 10,863,387 | B2 | 12/2020 | Alex et al. |
| 10,873,625 | B2 | 12/2020 | Zeng et al. |

(Continued)

FOREIGN PATENT DOCUMENTS

| | | | | | |
|---|---|---|---|---|---|
| CN | 110799942 | A | * | 2/2020 | ......... G06F 9/44505 |
| RU | 2852316 | C1 | * | 12/2025 | |
| WO | WO-2025145374 | A1 | * | 7/2025 | ............ H04W 24/06 |

*Primary Examiner* — Hamza N Algibhah

(57) ABSTRACT

A system comprises a memory communicatively coupled to at least one processor. The processor may be configured to receive a request to perform a data exchange operation with a communication system at a communication level and determine multiple configuration parameters based on the data exchange operation and, using a trained artificial intelligence algorithm, match the communication level to configuration information, attach a tag to the request referencing that the communication level is matched to the configuration information in response to matching the communication level to the configuration information, and generate an operational mesh to complete the data exchange operation over a mesh duration based on the configuration information in response to attaching the tag to the request. The processor may be configured to perform the data exchange operation using the operational mesh during the mesh duration and determine whether the data exchange operation is performed within the mesh duration.

20 Claims, 2 Drawing Sheets

(56) References Cited

U.S. PATENT DOCUMENTS

| | | | | |
|---|---|---|---|---|
| 11,663,047 | B2 | 5/2023 | Bartfai-Walcott et al. | |
| 11,765,219 | B2 | 9/2023 | Gordon | |
| 11,792,035 | B2 | 10/2023 | Ansari et al. | |
| 11,962,622 | B2 | 4/2024 | Kung et al. | |
| 12,056,579 | B1 * | 8/2024 | Mattar | G06N 20/00 |
| 12,106,156 | B2 | 10/2024 | Carre et al. | |
| 12,207,097 | B2 * | 1/2025 | Montalvo | H04W 16/10 |
| 12,218,794 | B2 | 2/2025 | Kumar et al. | |
| 2007/0027964 | A1 * | 2/2007 | Herrod | H04L 41/0889 709/220 |
| 2018/0152487 | A1 * | 5/2018 | Griffin | H04L 12/1818 |
| 2020/0394073 | A1 * | 12/2020 | Dutta | G06F 11/3409 |
| 2021/0014113 | A1 | 1/2021 | Guim Bernat et al. | |
| 2021/0389960 | A1 * | 12/2021 | Howley | G06F 11/3006 |
| 2022/0156665 | A1 | 5/2022 | Beth et al. | |
| 2022/0391252 | A1 * | 12/2022 | Chen | G06F 9/5011 |
| 2023/0206234 | A1 * | 6/2023 | Coker | G06Q 20/4097 705/44 |
| 2024/0095602 | A1 * | 3/2024 | Gonzales Sanchez | G06N 20/00 |
| 2024/0185079 | A1 * | 6/2024 | Singh | G06N 3/08 |
| 2025/0071826 | A1 * | 2/2025 | Alasti | H04W 16/10 |
| 2025/0386246 | A1 * | 12/2025 | Jubilee | H04W 28/084 |
| 2026/0100889 | A1 * | 4/2026 | Samdanis | H04L 41/142 |

* cited by examiner

SYSTEM AND METHOD TO ORCHESTRATE ACCESS TO COMMUNICATION INFRASTRUCTURE

TECHNICAL FIELD

The present disclosure relates generally to controlling access to communication infrastructure, and more specifically to a system and method to orchestrate access to communication infrastructure.

BACKGROUND

In communication systems, communications between two devices may involve multiple services. For example, a request may be processed, routed, and/or forwarded by multiple services between a first device and a second device. As the communication is exchanged, the services may be configured to modify one or more portions included in the request. To modify the request, the services may be configured to use infrastructure (e.g., optical fiber lines, data stores, and the like) that specialize in specific modifications. If a network does not include sufficient infrastructure and/or specific infrastructure needed to make specific modifications, communications may be interrupted or dropped.

SUMMARY OF THE DISCLOSURE

In one or more embodiments, a system and method to orchestrate access to communication infrastructure. In particular, the system may be configured to train an artificial intelligence algorithm to generate an artificial intelligence model configured to dynamically share infrastructure resources between two or more networks. In some embodiments, the system may be configured to receive requests to share one or more infrastructure elements with a requesting system and/or a requesting network. The requests may include one or more performance demands. After evaluating the request, the system may be configured to evaluate availability of resources in a local network associated with the system, determine one or more configuration settings to match security demands associated with the request, and generate an operation mesh to enable access of the infrastructure elements in the local network within a specific performance level and/or specific security level. The system may be configured to regulate the access provided to the requesting system and/or requesting network while maintaining the specific performance level and/or specific security level.

In one or more embodiments, the infrastructure elements may be one or more physical resources available in the system. The infrastructure elements may be one or more hardware and/or software resources available to the system to perform one or more operations. The infrastructure elements may comprise processing resources, memory resources and/or power resources in servers, data centers, workspace devices such as desktop computers, and the like. Further, the infrastructure elements may comprise software executed by hardware, such as applications, services, application programing interfaces (APIs), and the like. The infrastructure elements may be one or more physical facilities that store application information (e.g., service configurations) and data associated with one or more operations performed in the system. The infrastructure elements may comprise locations where computing and networking equipment is used to collect, process, and store data, as well as to distribute and enable access to processing resources, memory resources, and/or power resources.

In some embodiments, the system may be configured to provision an operational mesh (e.g., a communication path) comprising specific infrastructure elements. The system may be configured to provide access between the requesting system and/or requesting network and the specific infrastructure elements. In some embodiments, the actions and/or operations of the infrastructure elements may be evaluated, diagnosed, controlled, and/or managed by the system upon execution of one or more artificial intelligence algorithms to generate one or more artificial intelligence models. The artificial intelligence models may be supervised artificial intelligence models and/or unsupervised artificial intelligence models, among others. The supervised artificial intelligence models may be artificial intelligence models trained to understand and/or predict operations associated with a specific user profile in the local network. The unsupervised artificial intelligence models may be artificial intelligence models trained to understand and/or predict operations associated with general behavior of entities interacting with the local network. The artificial intelligence models may be implemented in accordance with one or more guidelines, to perform network analyses using one or more neural networks, and/or one or more large language models (LLMs). The neural networks may be a computing system comprising a network of interconnected nodes, called artificial neurons, to process data in a decentralized manner. The LLMs may be artificial intelligence models that use machine learning to process and generate human language.

In one or more embodiments, the systems are directed to improvements in computer systems. Specifically, the infrastructure elements may comprise servers and/or operations performed by servers. Herein, the systems reduce processor and memory usage in data centers and/or servers in the data centers by reducing and/or inhibiting over provisioning and/or under provisioning of servers when the infrastructure elements are shared with the requesting system and/or requesting network. Herein, processing and memory usage is reduced because processing and memory resources are not wasted in shared infrastructure elements. Instead, the system provisions infrastructure elements to include a specific number of resources that are expected to be used at higher levels of efficiency while performing specific operations on behalf of the requesting system and/or requesting network. Further, the system is configured to prevent resources from being wasted by data centers and/or individual servers in data centers by provisioning resources in new servers to meet and/or match specific performance levels. Herein, meeting and/or matching specific performance levels may correspond to using resources in infrastructure elements to meet one or more specific target operational performances.

In some embodiments, the system may be configured to increase the security of data exchange operations performed in hybrid communication networks comprising a local network and a requesting network. In particular, the system is configured to evaluate requests from a communication system located in the requesting network and determine whether one or more infrastructure elements located in the local network are available to be shared with the communication system. The system provides a decentralized system configured to generate multi-dimension tokens in which the request from the requesting network is mapped to multiple dimensions at different security levels and/or performance levels. The security levels and/or the performance levels may be referred as communication levels. A trained artificial intelligence algorithm may use the multi-dimension token configured to reference configuration parameters and access commands that guide the requesting network to access, use, and/or partially modify specific infrastructure elements in the local network. The system may rely on information comprised in the multi-dimension token to maintain a performance level, a usage level, and/or a security level in the specific infrastructure elements shared with the requesting network over time.

In some embodiments, the system may be configured to generate an operational mesh in which the requesting network is configured to access portions of the local network including the infrastructure elements. The system may be configured to control access to the infrastructure elements in the operational mesh based on specific performance levels, usage levels, and/or security levels. The system may use the trained artificial intelligence algorithm to modify configuration parameters that regulate access and/or usage in the infrastructure elements to inhibit, reduce, and/or eliminate performance anomalies in the local network.

There may be multiple performance anomalies caused by inefficient use of resources in a local network. For example, performance anomalies such as CPU overutilization, memory leaks, or disk I/O bottlenecks may slow down processing and negatively impact an entire data center. The negative impacts of the performance anomalies may include: 1) dropping application operations that rely on servers hosting and/or server usage; 2) compromising data sets and/or databases stored in specific data centers because servers are unresponsive and/or offline; and 3) creation of cybersecurity vulnerabilities due to overburdened servers (e.g., Distributed Denial-of-Service (DDoS) attacks). To the extent that these performance anomalies are caused by underutilization of resources and/or over utilization of resources in infrastructure elements (e.g., inefficient usage of resources), the system may be configured to predict and/or proactively address the performance anomalies before anomalies occur in the operational meshes. In this regard, the system improves processing performance in a data center by avoiding anomalies such as CPU overutilization, memory leaks, or disk I/O bottlenecks. Another technical advantage resulting from predicting and avoiding performance anomalies in infrastructure elements includes inhibiting, reducing, and/or eliminating network congestions. Performance anomalies like network congestion or bandwidth saturation can lead to increased latency in the data center, slowing down data transfer speeds and application responsiveness. By predicting and/or proactively avoiding these anomalies from occurring, the infrastructure elements may be configured to improve network traffic flows more smoothly, ensuring low-latency performance for applications, and services hosted in the data center.

In one or more embodiments, unlike conventional data centers and/or servers, the system and method detect and/or proactively resolve performance bottlenecks promptly and effectively. Detecting performance bottlenecks occurring in a data center promptly and accurately and further promptly resolving detected performance bottlenecks provides several technical advantages. Resolving performance bottlenecks in a data center directly improves the performance of the data center in several ways. For example, resolving a performance bottleneck may result in improved data center efficiency. By addressing bottlenecks, the system may manage more requests and complete tasks more quickly. Herein, the system may be configured to increase processing data speeds, quicker application response times, and overall higher throughput. An additional technical advantage of promptly detecting and resolving performance bottlenecks may include improved resource utilization. For example, when bottlenecks are resolved, the use of data center resources like CPUs, memory, storage, and network bandwidth may be improved. These improvements may lead to more faster analyses, operations, and/or prevents certain resources from becoming overworked while resources are utilized. Another technical advantage of promptly detecting and resolving performance bottlenecks may include reduced system latency. Bottlenecks often cause delays in data transfer or processing, leading to slower response times for applications and services. By resolving bottlenecks, latency is reduced, and the performance of critical applications improves, which is especially important for time-sensitive tasks.

In one or more embodiments, the system may comprise an apparatus, such as the server. Further, the system may be a data exchange system, that comprises the apparatus. In addition, the system may be configured to perform operations as part of a process performed by the apparatus. As a non-limiting example, the system may comprise a memory and at least one processor communicatively coupled to one another. The memory may be operable to store a system profile comprising entitlements associated with a communication system and infrastructure status information representing availability of multiple nodes in a communication layer in the apparatus. The at least one processor may be configured to receive a request to perform a data exchange operation with the communication system at a communication level and determine multiple configuration parameters based on the data exchange operation. The configuration parameters may comprise guidance to perform the data exchange operation. Further, the processor may be configured to transmit the configuration parameters to a decentralized network configured to create a multi-dimension token comprising configuration information corresponding to a configuration parameter of the configuration parameters.

In some embodiments, the processor may be configured to receive the multi-dimension token from the decentralized network, and train, in a first stage, an artificial intelligence algorithm using first input data comprising the system profile, previous data exchange operations performed by the communication system, and the infrastructure status information. The processor may be configured to, using the artificial intelligence algorithm, match the communication level to the configuration information, attach a tag to the request referencing that the communication level is matched to the configuration information in response to matching the communication level to the configuration information, and generate an operational mesh to complete the data exchange operation over a mesh duration based on the configuration information in response to attaching the tag to the request. The data exchange operation may comprise a first sub-operation and a second sub-operation. The operational mesh may comprise a first resource node in the communication layer configured to perform the first sub-operation. The operational mesh may comprise a second resource node in the communication layer configured to perform the second sub-operation.

The processor may be configured to assign an access token to the data exchange operation based on the communication level. The access token may reference the first sub-operation and the second sub-operation to be performed on the operational mesh over the mesh duration. The processor may be configured to perform the data exchange operation using the operational mesh during the mesh duration and determine whether the data exchange operation is performed within the mesh duration.

The processor may be configured to train, in a second stage, the artificial intelligence algorithm using second input data comprising the system profile, the plurality of previous data exchange operations performed by the communication system, the infrastructure status information; and the operational mesh in a positive feedback loop in response to determining that the data exchange operation is performed within the mesh duration.

The processor may be configured to train, in the second stage, the artificial intelligence algorithm using third input data comprising the system profile, the plurality of previous data exchange operations performed by the communication system, the infrastructure status information; and the operational mesh in a negative feedback loop in response to determining that the data exchange operation is performed within the mesh duration.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
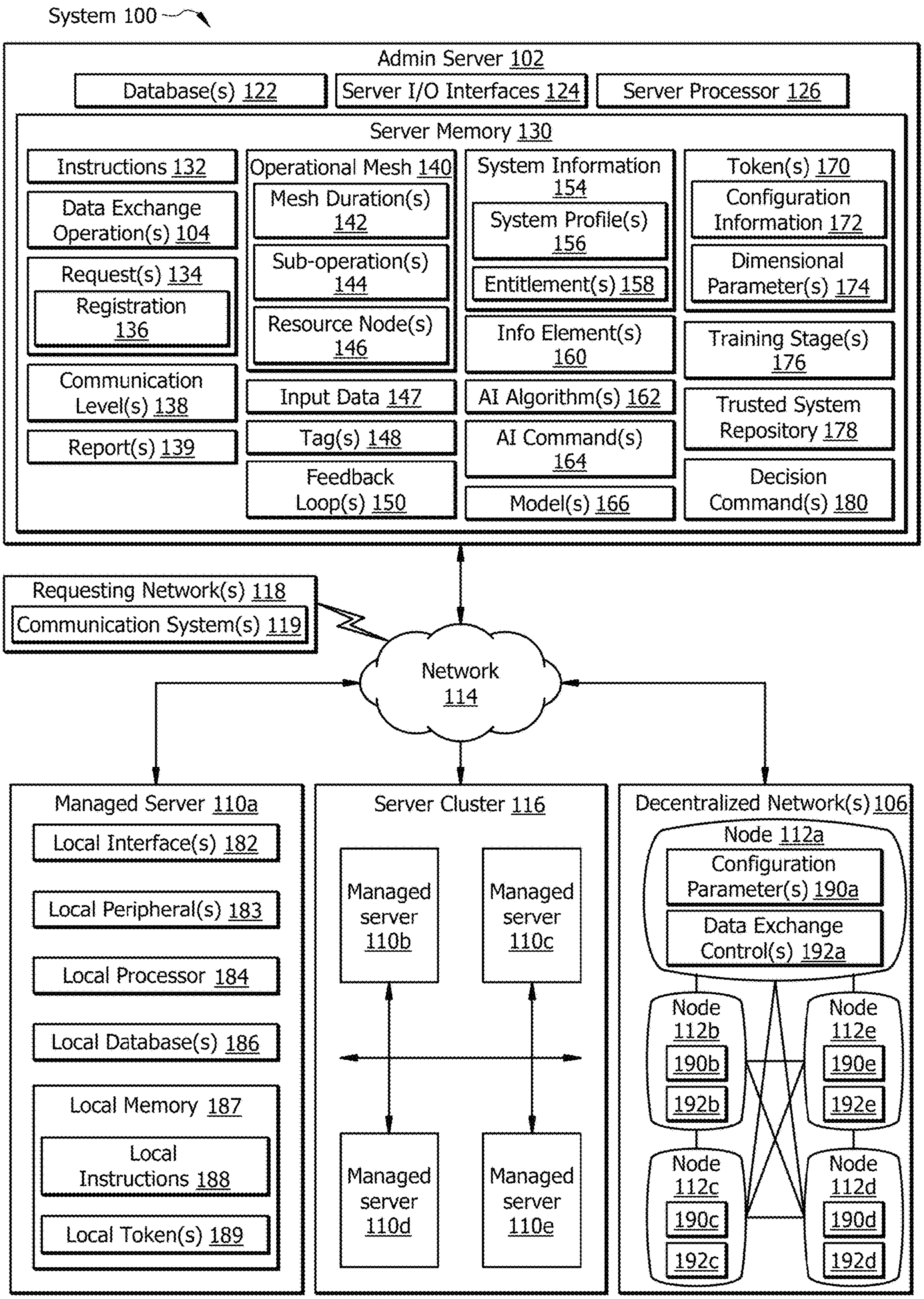
FIG. 1 illustrates a system in accordance with one or more embodiments.
Figure 2:
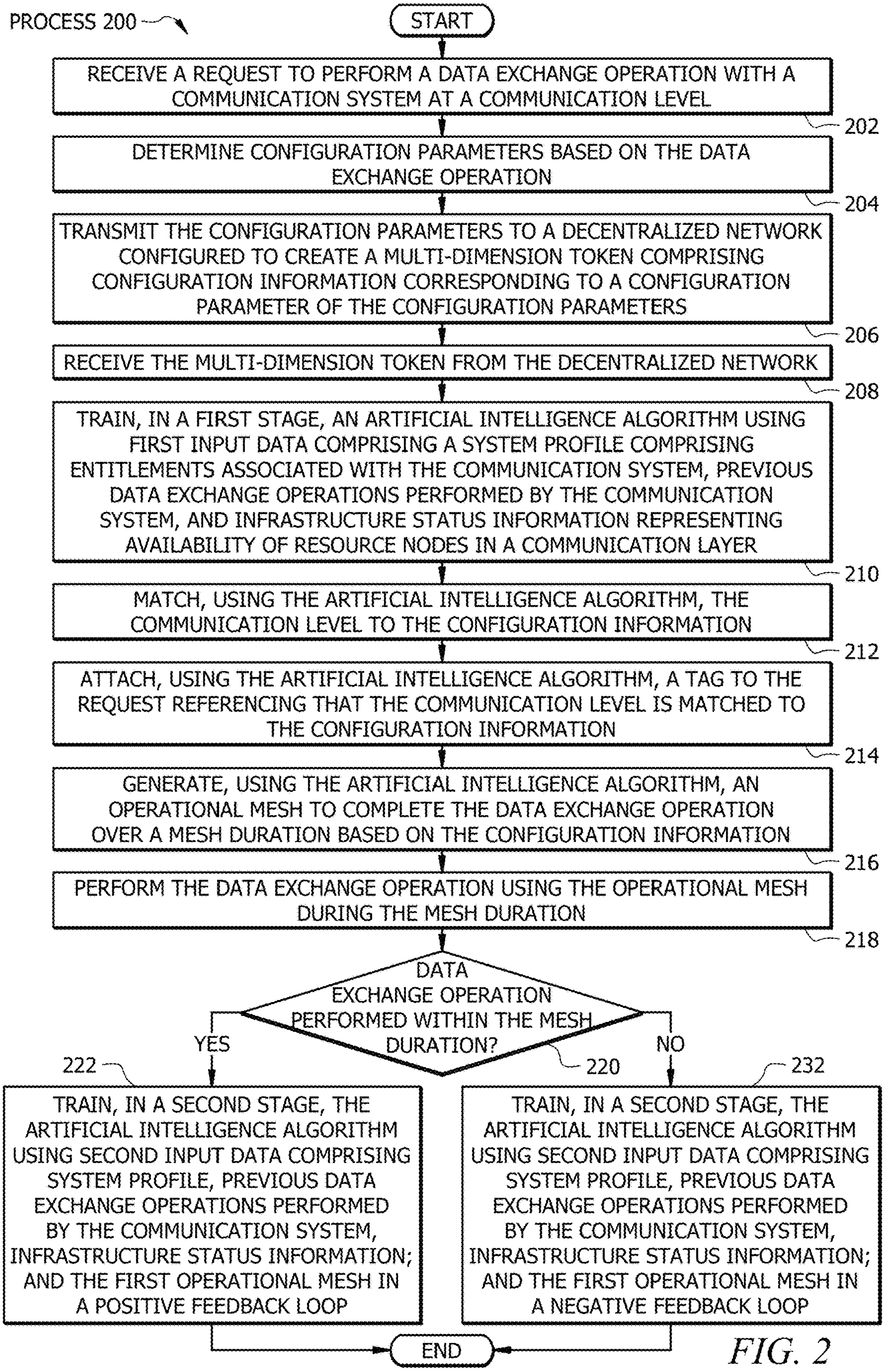
FIG. 2 illustrates an example flowchart of a method to performed by the system of FIG. 1 in accordance with one or more embodiments.

As described above, this disclosure provides one or more systems and methods to orchestrate access to communication infrastructure. FIG. 1 illustrates a system 100 in which an admin server 102 performs one or more data exchange operations 104 in association with one or more decentralized networks 106. FIG. 2 illustrates a process 200 performed by the system 100 of FIG. 1.

System Overview

FIG. 1 illustrates an example system 100, in accordance with one or more embodiments. The system 100 may comprise an admin server 102 configured to perform one or more data exchange operations 104 in association with one or more decentralized networks 106. The system 100 includes the admin server 102 communicatively coupled to a managed server 110*a*, a managed server 110*b*, a managed server 110*c*, and a managed server 110*d* (collectively, managed servers 110, a node 112*a*, a node 112*b*, a node 112*c*, a node 112*d*, and a node 112*e* (collectively, nodes 112) in the one or more decentralized networks 106 via a network 114. The managed servers 110 may be instructing nodes configured to control, monitor, and assign testing operations to other nodes in a local network. The managed servers 110 may be working nodes configured to receive instructions to perform one or more testing operations based on instructions received from the instructing node. In some embodiments, some of the managed servers 110 may be clustered together in a server cluster 116. Further, the managed servers 110 are representative of possible infrastructure elements communicatively coupled with the network 114.

In some embodiments, one or more requesting networks 118 may be communicatively coupled with the network 114 via a communication link 120. The requesting networks 118 may comprise one or more communication systems 119. The requesting networks 118 may be configured to request access to one or more of the infrastructure elements controlled by the admin server 102.

In one or more embodiments, the admin server 102 may comprise one or more databases 122, one or more server input (I)/output (O) interfaces 124, at least one server processor 126, and at least one server memory 130 communicatively coupled to one another. In some embodiments, the server memory 130 may be operable to store instructions 132, the one or more data exchange operations 104, one or more requests 134 referencing at least one registration 136, one or more communication levels 138, one or more reports 139, and at least one operational mesh 140. Each operational mesh 140 may comprise at least one mesh duration 142 and multiple sub-operations 144 performed by multiple resource nodes 146. Each resource node 146 may perform one or more sub-operations 144. In some embodiments, multiple resource nodes 146 may be configured to perform one or more specific sub-operations 144. Further, the server memory 130 may be operable to store input data 147 to train one or more algorithms, one or more tags 148, one or more feedback loops 150, system information 154 comprising multiple system profiles 156 associated with multiple entitlements 158, information on one or more infrastructure elements 160, one or more artificial intelligence algorithms 162, one or more artificial intelligence commands 164, one or more models 166, one or more tokens 170 comprising configuration information 172 and/or one or more dimensional parameters 174, one or more training stages 176, at least one trusted system repository 178, and one or more access commands 180.

Referring to the managed server 110*a* a non-limiting example, the managed server 110*a* may comprise one or more local interfaces 182, one or more local peripherals 183, at least one local processor 184, one or more local databases 186, and at least one local memory 187 communicatively coupled to one another. The local memory 187 may comprise local instructions 188 and/or one or more local tokens 189.

Referring to the node 112*a* a non-limiting example, the node 112*a* may comprise one or more configuration parameter 190*a* and/or one or more data exchange controls 192*a*. In the example of FIG. 1, the node 112*b* includes one or more configuration parameter 190*b* and/or one or more data exchange controls 192*b*, the node 112*c* includes one or more configuration parameter 190*c* and/or one or more data exchange controls 192*c*, the node 112*d* includes one or more configuration parameter 190*d* and/or one or more data exchange controls 192*d*, and the node 112*e* includes one or more configuration parameter 190*e* and/or one or more data exchange controls 192*e*.

System Components

Server

The admin server 102 is generally any device or apparatus that is configured to process data and communicate with computing devices (e.g., the managed servers 110 and/or the nodes 112), additional databases, systems, and the like, via the one or more server I/O interfaces 124 (i.e., a user interface or a network interface). The admin server 102 may comprise the server processor 126 that is generally configured to oversee operations of a processing engine. The operations of the processing engine are described further below in conjunction with the system 100 described in FIG. 1 and the process 200 described in FIG. 2.

The admin server 102 comprises multiple databases 122 configured to provide one or more memory resources to the admin server 102 and/or the managed servers 110. The admin server 102 comprises the server processor 126 communicatively coupled with the databases 122, the server I/O interfaces 124, and the server memory 130. The admin server 102 may be configured as shown, or in any other configuration. In one or more embodiments, the databases 122 are configured to store data that enables the admin server 102 to configure, manage and coordinate one or more middleware systems. In some embodiments, the databases 122 store data used by the admin server 102 to act as a halfway point in between one or more services and other tools or databases.

In one or more embodiments, the databases 122 may be one or more data and/or information repositories configured to store structured and/or unstructured information. In one example, the admin server 102 may determine the server processor 126 is available (e.g., running) to perform a specific service. In another example, the admin server 102 may determine that a specific managed server is running to enable a testing application and/or perform the specific service upon receiving a server response indicating that a corresponding managed server is available to perform the service. The databases 122 may be configured to store one or more tokens 170, starting data and/or one or more data anomalies of data instead of storing coded data. In this regard, the one or more tokens 170 and/or the starting data may be encoded in accordance with predefined encoder configured to determine integrity of data and/or information exchanged with the admin server 102.

In one or more embodiments, the server I/O interfaces 124 may be configured to enable wired and/or wireless communications. The server I/O interfaces 124 may be configured to communicate data between the admin server 102 and other user devices (i.e., the managed servers 110 and/or the nodes 112), network devices (i.e., routers in the network 114), systems, or domain(s) via the network 114. For example, the server I/O interfaces 124 may comprise a WI-FI interface, a LAN interface, a WAN interface, a modem, a switch, or a router. The server processor 126 may be configured to send and receive data using the server I/O interfaces 124. The server I/O interfaces 124 may be configured to use any suitable type of communication protocol. In some embodiments, the server I/O interfaces 124 may be an admin console comprising a web browser base or graphical user interface used to manage a middleware server domain via the admin server 102. A middleware server domain may be a logically related group of middleware server resources that managed as a unit. A middleware server domain may comprise the admin server 102 and one or more managed servers 110. The managed servers 110 may be standalone devices and/or collected devices in the server cluster. The server cluster may be a group of managed servers 110 that work together to provide scalability and higher availability for the services. In this regard, the services are developed and deployed as part of at least one domain. In other embodiments, one instance of the managed servers 110 in the middleware server domain may be configured as the admin server 102. The admin server 102 provides a central point for managing and configure the managed servers 110 and any of the one or more services. The managed servers 110 are part of some of the infrastructure elements.

The server processor 126 comprises one or more processors communicatively coupled to the server memory 130. The server processor 126 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 126 may be a programmable logic device, a microcontroller, a microprocessor, or any suitable combination of the preceding. The one or more server processor 126 are configured to process data and may be implemented in hardware or software executed by hardware. For example, the server processor 126 may be 8-bit, 16-bit, 32-bit, 64-bit or of any other suitable architecture. The server processor 126 may include an arithmetic logic unit (ALU) for performing arithmetic and logic operations, processor registers that supply operands to the ALU and store the results of ALU operations, and a control unit that fetches the instructions 132 from the server memory 130 and executes them by directing the coordinated operations of the ALU, registers and other components. In this regard, the one or more server processor 126 are configured to execute various instructions. For example, the one or more server processor 126 are configured to execute the instructions 132 to implement the functions disclosed herein, such as some or all of those described with respect to FIGS. 1 and 2. In some embodiments, the functions described herein are implemented using logic units, FPGAs, ASICs, DSPs, or any other suitable hardware or electronic circuitry.

In one or more embodiments, the server I/O interfaces 124 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The server I/O interfaces 124 may be configured to support any suitable type of communication protocol as would be appreciated by one of ordinary skill in the art. In one or more embodiments, the server I/O interfaces 124 may comprise one or more sensors configured to evaluate physical phenomena surrounding the admin server 102 and/or one or more of the managed servers 110. The sensors may be proximity sensors, optical sensors, and the like.

The server memory 130 may be volatile or non-volatile and may comprise a read-only memory (ROM), random-access memory (RAM), ternary content-addressable memory (TCAM), dynamic random-access memory (DRAM), and static random-access memory (SRAM). The server memory 130 may be implemented using one or more disks, tape drives, solid-state drives, and/or the like. The server memory 130 is operable to store the instructions 132, the one or more data exchange operations 104, the one or more requests 134 referencing at least one the registration 136, the one or more communication levels 138, the one or more reports 139, and the at least one operational mesh 140. Further, the server memory 130 may be operable to store the input data 147 to train one or more algorithms, the one or more tags 148, the one or more feedback loops 150, the system information 154 comprising the multiple system profiles 156 associated with the multiple entitlements 158, the information on the one or more infrastructure elements 160, the one or more artificial intelligence algorithms 162, the one or more artificial intelligence commands 164, the one or more models 166, the one or more tokens 170 comprising the configuration information 172 and/or the one or more dimensional parameters 174, the one or more training stages 176, the at least one trusted system repository 178, and the one or more access commands 180. The instructions 132 may comprise any suitable set of instructions, logic, rules, or code operable to execute the server processor 126.

The one or more data exchange operations 104 may be one or more operations configured to convert one or more data elements to obtain, distribute, and/or modify one or more data objects. Further, the data exchange operations 104 may be one or more operations configured to modify and/or exchange data objects after being triggered by one or more requests 134. The one or more requests 134 may be one or more information strings, alphanumeric data, and/or configuration commands to be exchanged in a data network.

In one or more embodiments, the data exchange operations 104 are configured to create, analyze, manage, and update one or more tokens 170. The data exchange operations 104 may be configured to communicate one or more of the requests 134 with the one or more decentralized networks 106 via user and/or network interfaces and connections. The data exchange operations 104 may be configured to perform one or more of the operations in the operational mesh 140. In some embodiments, the data exchange operations 104 may be configured to update one or more system profiles 156 in the system information 154. In some embodiments, the admin server 102 may be configured to generate the tokens 170 to perform one or more of the data exchange operations 104 with the decentralized network 106 as triggered by one or more of the managed servers 110.

The one or more requests 134 may be one or more communications configured to provide triggers in the form of communication or control signals to start operations such as fetching the instructions 132 or running one or more additional data exchange operations 104. The requests 134 may provide system information 154 to the admin server 102 to indicate one or more elements of at least one system profile 152 associated with one or more of the entitlements 158 to access and/or modify any of the services available in the admin server 102 and/or one or more of local applications in the managed servers 110. The requests 134 may be configured to provide lists, security information, and configuration commands that the admin server 102 uses to set up a specific service for one of the managed servers 110. The requests 134 may comprise data that provides starting procedure configuration to the admin server 102. In one or more embodiments, the requests 134 may be optimized instructions that trigger establishing of a specific procedure in the admin server 102.

In one or more embodiments, the requests 134 may comprise a request for registration 136 of a communication system 119 in a requesting network 118 to access one or more infrastructure elements controlled by the admin server 102. The registration 136 may comprise access request information from the communication system 119. The registration 136 may be used to generate one or more configuration parameters 190 configured to provide guidance to perform one or more specific data exchange operations 104. In some embodiments, the configuration parameters 190 may be one or more configuration selections for one or more managed servers 110 and/or server clusters 116. The configuration parameters 190 may instruct operation arrangements of one or more of the services and/or one or more configuration aspects of the managed servers 110 and/or server clusters 116 over a period of time.

In yet other embodiments, one or more of the managed servers 110 may request the decentralized networks 106 via the admin server 102 to perform one or more data exchange operations 104 an generate the tokens 170 dynamically or periodically over time in accordance with one or more configuration parameters 168. The configuration parameters 168 may at least be partially based on the requests 134 from the managed servers 110. The triggers received from the managed servers 110 may be referenced as part of one or more configuration parameters 168. In some embodiments, the tokens 170 may be a non-fungible token (NFT) that are generated along encrypted geolocation of the managed servers 110 and point-of-exchange (PoE) information. The PoE information may comprise location information in which a request 134 is triggered by one of the managed servers 110. In some embodiments, the PoE information indicate a relation between a specific data exchange operation 104, one or more entitlements 158, and one or more system profile 152 obtained when a data exchange is attempted. The tokens 170 may be a string of numbers, alphanumeric characters, one or more words or phrases, one or more letters, and/or symbols that are minted in the decentralized networks 106 (e.g., a blockchain) in accordance with a specific protocol and/or data exchange encryption. In some embodiments, the tokens 170 are generated in accordance with one or more token attributes. The admin server 102 may be configured to present data exchange output receipts in one or more reports 139 to the managed servers 110.

In some embodiments, the data exchange operations 104 may be executed by the server processor 126 configured to enable data objects comprising one or more data elements to be exchanged between the admin server 102, the managed servers 110, and/or one or more additional devices communicatively coupled to the admin server 102 via the network 114. In one or more embodiments, the data exchange operations 104 may be configured to indicate one or more data objects (e.g., via data object information) to be exchanged between the admin server 102 and at least one of the managed servers 110.

In one or more embodiments, the one or more data exchange operations 104 may be one or more operations performed by one or more services. The data exchange operations 104 may be one or more operations comprising multiple stages and/or transitions at different services. For example, one or more data exchange operations 104 may be configured to start at one service that transitions to other services. For example, the admin server 102 may be configured to set up one or more data exchange operations 104 and one or more data elements and/or data records to be modified by the data exchange operations 104 performed by one or more services. The one or more data elements may be individual data in one or more data objects. The data elements may be alphanumeric bitstrings comprising a specific format. The data elements may be data information configured to reference data objects stored in a specific database. The one or more data records may be one or more tables, ledgers, files, and/or data documents comprising information relating to one or more data objects. In some embodiments, each of the data exchange operations 104 may be configured to modify one or more data elements and/or one or more data records. The admin server 102 may be configured to keep track and/or monitor one or more of the data elements and/or the data records as the data exchange operations 104 transition between two or more services.

The one or more communication levels 138 may be one or more levels configured to guide analysis and/or tracking of anomalies in one or more hops (e.g., transitions) of the data exchange operation 104 along a specific operational mesh 141*a*. The communication levels 138 may be full path (e.g., enriched) communication levels that comprise tracking inputs and outputs associated with the data exchange operation 104 from an origin point (e.g., a starting resource node 146) to a completion point (e.g., an ending resource node 146) in the operational mesh 140. The communication levels 138 may be granularity communication levels that comprise tracking inputs and outputs associated with one or more specific sub-operations 144 at one or more specific resource nodes 146 in the operational mesh 140.

The one or more operational mesh 140 may be one or more processes for completing one or more data exchange operations 104. Each operational mesh 140 may comprise at least one mesh duration 142, one or more sub-operations 144, and one or more resource nodes 146. The one or more mesh durations 142 may be a time-based duration and/or an operation-based duration in which a given data exchange operation 104 is expected to be completed. The one or more sub-operations 144 may be one or more operations performed in accordance with one or more communication levels 138. The one or more resource nodes 146 may be one or more hops and/or stops in which data is modified to complete a given data exchange operation 104.

The one or more communication levels 138 may be one or more levels configured to guide integrity of data over one or more hops (e.g., transitions) of the data exchange operation 104 along a specific operational mesh 140. The communication levels 138 may be operation-specific levels (e.g., request levels) that cause a generated token 170 to reference starting data to be modified by all of the sub-operations 144 in a given operational mesh 140 including one or more specific infrastructure elements. The communication levels 138 may be record-specific levels (e.g., record levels) that cause the generated token 170 to reference the starting data to be modified by each of the sub-operations 144 in the given operational mesh 140. The communication levels 138 may be data element-specific levels (e.g., data-element levels) that cause the generated token 170 to reference the starting data to be modified by at least one of the sub-operations 144 in the given operational mesh 140. In one or more embodiments, the communication levels 138 may be guidance for updating one or more tokens 170 as the given operational mesh 140 are completed.

The sub-operations 144 may be one or more operations performed by one or more of the managed servers 110 and/or the admin server 102. The sub-operations 144 may be one or more operations that relate to one or more sub-systems in a server cluster 116. The sub-operations 144 may comprise one or more may comprise one or more operations associated with ventilation control, regulation and/or analysis of the cooling and/or heating systems in a given operational mesh 140. The sub-operations 144 may comprise one or more operations associated with power generation, distribution, and/or storage of power supply systems that power one or more of the resource nodes 146. The sub-operations 144 may comprise one or more operations associated with automation, data analyses, and/or training mechanisms in a given operational mesh 140. The sub-operations 144 may comprise one or more operations associated with safety, encryption/decryption, and/or control of sensitive information exchanged with a given data operational mesh 140. The sub-operations 144 may comprise one or more operations associated with server operations, decentralized data analyses performed in the decentralized networks 106, and/or centralized communications associated with one or more managed servers 110 in a given operational mesh 140.

In one or more embodiments, the data exchange operations 104 may be one or more operations configured to be performed at multiple locations. The data exchange operations 104 may be operations distributed to exchange one or more data objects associated with one or more managed servers 110. The data exchange operations 104 may be distributed in multiple locations physically separated from one another. The data exchange operations 104 may be testing operations performed to evaluate one or more portions of application data associated with one or more of the services.

In one or more embodiments, a target (e.g., security, performance, and the like) associated a communication level 138 may be maintained in an operational mesh 140 within a predefined threshold value. For example, processor usage in a managed server 110 may be targeted for a predefined percentage efficiency. Herein, the threshold value is a limit associated with possible deviations from the targeted predefined efficiency. The one or more threshold values may be one or more specific numbers and/or number ranges associated with a specific parameter and/or indicator. The one or more threshold values may be a specific value representing a higher boundary or a lower boundary. The one or more threshold values may be one or more threshold ranges comprising higher boundaries and lower boundaries. The one or more threshold values may be a percentage value representing a similarity and/or a difference between one or more values assigned as tolerances for current configuration parameters 168, one or more reference data element values, and/or one or more reference data record values. The one or more threshold values may be determined based on information associated with the requests 134. The one or more threshold values may be determined dynamically over time. The one or more threshold values may be predefined and/or predetermined in accordance with information in activity associated with one or more of the requests 134. In some embodiments, the admin server 102 may be configured to calculate the one or more threshold values based on information obtained via the server I/O interfaces 124 and/or local interfaces 182.

The one or more tags 148 may be one or more indicators configured to reference that a communication level 138 is matched to specific configuration information 172. The tags 148 may be configured to reference that multiple portions of a request 134 correspond to specific parameters in the configuration parameters 190 determined from the request 134. The admin server 102 may be configured to generate one or more tags 148 for one or more portions of dimensional parameters 174. The tags 148 may be configured to comprise guidance to generate communication information 172. In some embodiments, the admin server 102 may be configured to determine one or more correlations between on e or more elements in the communication level 138 with one or more configuration parameters 190. The correlations may be one or more relations between one or more aspects of the communication level 138 to one or more dimensional parameters 174 in a token 170. In some embodiments, the server 102 may be configured to determine correlations that reference configuration information 172 that matches the communication level 138.

The feedback loops 150 may comprise data, metadata, and one or more reports 139 that is used to train, retrain, and/or replace information to train one or more artificial intelligence algorithms 162. The feedback loops 150 may comprise information provided by and/or obtained from the communication systems 119 and/or individual managed servers 110 during one or more communication operations.

The admin server 102 may be configured to perform one or more retrieving operations configured to determine data and/or metadata from the communication operations and generate one or more reports 139 associated with interactions of the communication systems 119 and/or individual managed servers 110. The feedback loops 150 may be provided continuously and/or periodically over time between two or more endpoints communicatively coupled with the network 114. The feedback loops 150 may be data indicating whether any of the communication systems 119 and/or individual managed servers 110 are attempting to perform one or more specific data exchange operations 104 in the system 100. The feedback loops 150 may be obtained via one or more of the server I/O interfaces 124. The feedback loops 150 may comprise multiple data samples. Each data sample may comprise a magnitude and a duration. The feedback loops 150 may be configured to indicate one or more attempted actions associated with the communication operations. The feedback loops 150 may indicate one or more changes in the behavior associated with one or more of the communication systems 119 and/or individual managed servers 110. In one or more embodiments, the data may be information data representative on one or more communication operations performed and/or triggered by the one or more communication systems 119 and/or individual managed servers 110. The metadata may be data that represents extracted information and/or summarized information associated with one or more operations attempted and/or performed by the one or more communication systems 119 and/or individual managed servers 110. In the example of FIG. 1, the data and/or metadata may be active information comprising business metadata and/or passive information comprising technical metadata. The active information may be metadata used by one of the applications and may be dynamic in nature. The passive information may be metadata collected from the applications during one or more application operations and may be static in nature. In one or more embodiments, the reports comprise one or more communications and/or transmissions configured to provide information relating to a status of one or more of the communication operations. The reports 139 may comprise and/or trigger alerts to other servers and/or one or more of the one or more communication systems 119 and/or individual managed servers 110. The configuration feedback may comprise one or more usage efficiencies configured to represent one or more usage efficiencies of the resource nodes 146. The usage efficiencies may be configured to reference and/or indicate performance of one or more aspects of performance in the one or more communication systems 119 and/or individual managed servers 110.

In one or more embodiments, the artificial intelligence algorithms 162 may be trained over multiple training stages 176. The training stages 176 may be different to one another. Over time, the admin server 102 may be configured to trigger one or more updates to the artificial intelligence algorithms 162, one or more artificial intelligence commands 164, and/or one or more models 166. The training stages 176 may be configured to provide specific parameterization to the artificial intelligence algorithms 162 at each stage.

In some embodiments, based on a type of feedback, the feedback loops 150 may comprise positive feedback or negative feedback. Positive feedback may comprise indicators referencing that a given operational mesh 140 effectively provided operational paths to the communication systems 119. For example, the positive feedback may reference that a given data exchange operation 104 is performed within a given mesh duration 142. Negative feedback may comprise indicators referencing that a given operational mesh 140 was not able to efficiently provide operational paths to the communication systems 119. For example, the negative feedback may reference that a given data exchange operation 104 is not performed within a given mesh duration 142.

In one or more embodiments, trained versions of the artificial intelligence algorithms 162 may be configured to perform one or more provisioning operations in the process of generating the operational meshes 140. The provisioning operations may be one or more operations performed to configure one or more services as part of the resource nodes 146. The provisioning operations may be one or more operations comprising multiple stages and/or transitions at different services. For example, one or more of the provisioning operations may be configured to start at one service that transitions to other services. For example, the admin server 102 may be configured to set up one or more of the provisioning operations and one or more data elements and/or data records to be modified by the one or more services in the resource nodes 146.

The provisioning operations may be one or more operations in which one or more access commands 180 and/or guidelines are generated. The provisioning operations may be configured to inform allocation of resource nodes 146 in a given operational mesh 140. The provisioning operations may comprise one or more instructions to purchase, order, construct, and/or assemble equipment in to add to one or more infrastructure elements to fulfill the requests 134. For example, the provisioning operations 103 may comprise instructions to purchase, install, and configure one or more ventilation solution in a given infrastructure element.

The provisioning operations may comprise one or more modification operations. The modification operations may be one or more one or more commands and/or guidelines configured to inform modification of resources nodes 146 in the operational mesh 140. The modification operations may comprise one or more instructions to move, rearrange, and/or exchange equipment in the resource nodes 146. For example, the modification operations may comprise instructions to replace, reinstall, and/or reconfigure one or more ventilation systems in a given infrastructure element.

The provisioning operations may comprise one or more orchestration operations. The orchestration operations may be one or more one or more commands and/or guidelines configured to inform movement and/or changes of the resource nodes 146. The orchestration operations may comprise one or more instructions to move, rearrange, and/or exchange equipment in the resource nodes 146. For example, the orchestration operations may comprise instructions to reroute, reallocate, and/or reposition one or more configuration settings in one or more ventilation systems in a given infrastructure element.

The system information 154 may comprise the one or more system profiles 152 and one or more entitlements 158 associated with each system profile 152. The system information 154 may be configured to associate one or more services with one or more communication systems 119. In one or more embodiments, the system profile 152 may comprise multiple profiles associated with one or more entitlements 158 to access and/or modify the services. Each of the system profile 152 may be associated with one or more entitlements 158. The entitlements 158 may indicate that a given managed server 110 is allowed to access one or more network resources in accordance with the one or more rules and policies. The entitlements 158 may indicate that a given managed server 110 is allowed to perform one or more operations in the system 100 (e.g., provide a specific application data access to one of the infrastructure elements). To secure or protect operations of the managed servers 110 from bad actors, the entitlements 158 may be assigned to a given system profile 152 in accordance with updated security information, which may provide guidance parameters to the use of the entitlements 158 based at least upon corresponding rules and policies. In one or more embodiments, the one or more services are access to one or more application operations performed in accordance with the application data. In some embodiments, the system profile 152 may comprise multiple profiles for requesting networks 118 and/or individual communication systems 119. Each system profile 152 may comprise one or more entitlements 158. As described above, the entitlements 158 may indicate that a given communication system 119 is allowed to access one or more network resources in accordance with one or more rules and policies. The entitlements 158 may indicate that a given communication system 119 is allowed to request performing one or more data exchanges in the managed servers 110. In one or more embodiments, each of the system profile 152 may comprise information about at least one communication system 119 entitled to trigger one or more data exchange operations 104 in the decentralized network 106 and/or the managed servers 110.

In some embodiments, one or more system profiles 156 in the system information 154 are associated with the trusted system repository 178. The trusted system repository 178 may be secure hardware configured to validate a security clearance associated with specific riles and policies.

The information on infrastructure elements 160 may comprise information associated with the managed servers 110 and/or additional resource nodes 146 available for operational mesh 140. The information on infrastructure elements 160 may be configuration feedback from one or more of the managed servers 110 and/or one or more control commands and/or identifiers associated with the managed servers 110. In the information on infrastructure elements 160, the admin server 102 may be configured to determine usage availability in the system 100.

In one or more embodiments, the artificial intelligence algorithms 162 may be executed by the server processor 126 to evaluate the requests 134. Further, the artificial intelligence algorithms 162 may be configured to interpret and transform the requests 134 and/or the instructions 132 into structured data sets and subsequently stored as files or tables. The artificial intelligence algorithms 162 may cleanse, normalize raw data, and derive intermediate data to generate uniform data in terms of encoding, format, and data types. The artificial intelligence algorithms 162 may be executed to run user queries and advanced analytical tools on the structured data. The artificial intelligence algorithms 162 may be configured to generate the one or more artificial intelligence commands 164 based on one or more results of the testing operations. The artificial intelligence commands 164 may be parameters that proactively trigger one or more of the data exchange operations 104 in accordance with path communication levels 138. The artificial intelligence commands 164 may be combined with the existing instructions 132 to dynamically trigger and/or perform the data exchange operations 104. The artificial intelligence commands 164 may be configured to trigger one or more cognitive artificial intelligence operations in accordance with one or more models 166. The models 166 may be trained by the one or more artificial intelligence algorithms 162 based on historic information associated with any data exchange operations 104 performed with the admin server 102.

The input data 147 may be data used to train one or more artificial intelligence algorithms 162. The input data 147 may comprise the system profile 156, previous data exchange operations 104 performed by the communication system 119 in the network 114, infrastructure status information in the information on infrastructure elements 160, the operational mesh 140 in a feedback loop 150, and/or historical data associated with generating access commands 180, among others. The access commands 180 may reference one or more resources associated with the managed servers 110 and/or one or more roles of the managed servers 110 in the system 100.

In some embodiments, the historical data may be information associated with previous performance of the managed servers 110, expected performance of the managed servers 110, and expected usage availability in the managed servers 110. The historical data may be historic information associated with one or more data exchange operations in a communication network. The historical data may comprise one or more historic indicators representing one or more trends associated with usage of tokens 170 for a specific data exchange operation 104, specific services, and/or specific configuration parameters 190. The historical data may be information associated with specific data center information associated with a specific managed server 110. In some embodiments, one or more models 166 may be one or more artificial intelligence models 166 configured to evaluate tracked activity and predicted activity associated with one or more managed servers 110 against general historical data. The general historical data may be information associated with generalized data center information that is not associated with infrastructure elements. The historical data may be some of the information used to train the artificial intelligence algorithms 162, one or more supervised models 166, and/or one or more unsupervised models 166.

The one or more tokens 170 may comprise one or more authentication parameters and/or one or more communication parameters configured to verify authenticity of one or more portions of data associated with the data exchange operations 104. The services may be configured to generate one or more tokens. Herein, the admin server 102 may be configured to determine one or more verification elements and save these verification elements in the form of one or more tokens 170. In one or more embodiments, the tokens 170 may be configured to provide reference verification information to confirm whether verification information received is authentic and/or whether one or more data exchange operations transitions from another service are acceptable or not acceptable. The tokens 170 may comprise access credentials associated with one or more services expected to perform one or more of the data exchange operations 104. The one or more tokens 170 may be configured to reference whether a specific service is entitled to access network resources associated with performing one or more data exchange operations 104 at the specific service. In some embodiments, the tokens 170 may comprise one or more data elements referencing a service precedence and/or a service destination. In some embodiments, the tokens 170 may be creates, deleted, and/or modified after one or more of the services trigger a specific data exchange operation 104. The tokens 170 may be modified, updated, removed, and/or eliminated in accordance with one or more smart contracts. The tokens 170 may be one or more multi-dimensional token comprising configuration information 172, and one or more-dimensional parameters 174.

The configuration information 172 may be one or more indicators configured to provide information associated with one or more knowledge domains and/or operations of entities accessing the network 114. The configuration information 172 may be stored in one or more formats. The server processor 126 may be configured to generate the one or more configuration information 172 based on information collected from one or more specific services. The configuration information 172 may be replaced, updated, and/or modified dynamically. The configuration information 172 may be replaced, updated, and/or modified periodically.

In one or more embodiments, the dimensional parameters 174 may be security configuration commands and/or regulatory commands predefined by an organization or one or more users. In one or more embodiments, the dimensional parameters 174 may be dynamically defined by the one or more managed servers 110. The dimensional parameters 174 may be prioritization rules configured to instruct one or more managed servers 110 to perform one or more operations in the system 100 in a specific data exchange operation 104. The dimensional parameters 174 may be predetermined and/or dynamically assigned by a corresponding user or an organization associated with the users.

The dimensional parameters 174 may be one or more indicators configured to provide information associated with one or more knowledge domains and/or operations of entities accessing the network 114. The dimensional parameters 174 may be stored in one or more formats. The server processor 126 may be configured to generate the one or more dimensional parameters 174 based on information collected from one or more specific managed servers 110. The dimensional parameters 174 may be replaced, updated, and/or modified dynamically. The dimensional parameters 174 may be replaced, updated, and/or modified periodically. The dimensional parameters 174 may be one or more conditions imposed in the reception and/or transmission of information during data exchange operations 104.

The configuration information 172 may be one or more parameters created using trained artificial intelligence algorithms 162 to track performance aspects of a given managed server 110. The configuration information 172 may be at least partially similar among managed servers 110. For example, first configuration information 172 for a first managed server 110 may comprise tracking operational mesh 140 performance for a period of time while second configuration information 172 for a second managed server 110 may comprise tracking usage in the operational mesh 140 for the same period of time. In this example, while both sets of configuration information 172 relate to the operational mesh, the first configuration information 172 tracks performance (e.g., efficiency, power consumption, and the like against a target), while the second configuration information 172 tracks usage (e.g., efficiency, power consumption, and the like as raw values). The configuration information 172 may be different from one managed server 110 to another. For example, first configuration information 172 for a first managed server 110 may comprise tracking system performance of a first resource node 146 for a period of time while second configuration information 172 for a second managed server 110 may comprise tracking security system performance of a second resource node 146 for the same period of time.

The one or more reports 139 may comprise data indicating warnings and alerts among other information. In some embodiments, the one or more reports 139 may be audio and/or visual signaling presented in the one or more server I/O interfaces 124. In one or more embodiments, the one or more reports 139 may comprise a release roadmap to incorporate the one or more possible anomaly corrections and/or suggestions into the operational mesh 140. In some embodiments, the one or more reports 139 may be generated to indicate one or more instructions 132 to incorporate the one or more possible modification suggestions into the operational mesh 140.

Requesting Networks

In one or more embodiments, each of the requesting networks 118 may comprise one or more of the elements described in reference to the network 114. A first difference between the requesting networks 118 and the network 114 may be that the requesting networks 118 are not seamlessly allowed (e.g., have access to specific credentials) to communicate with infrastructure elements in the network 114 whereas the networks 114 may be a. A second difference between the requesting networks 118 and the network 114 may be that the requesting networks 118 are not at least partially allowed to communicate with infrastructure elements in the network 114. A third difference between the requesting networks 118 and the network 114 may be that the requesting networks 118 may only communicate with the admin server 102 in the system 100. A fourth difference between the requesting networks 118 and the network 114 may be that the requesting networks 118 are required to request 134 a registration 136 with the admin server 102.

The communication system 119 may be one or more systems comprising one or more portions of a requesting network 118. The communication system 119 may comprise hardware and software executed by hardware configured to perform one or more operations. The communication system 119 may be configured to transmit one or more requests 134 to the admin server 102. The communication system 119 may be configured to receive and/or exchange data exchange operations 104 between the requesting networks 118 and one or more infrastructure elements in the system 100.

Managed Servers

In some embodiments, the managed servers 110 may be configured to perform one or more of the operations described in reference to the admin server 102. As described above, the managed servers 110 may comprise the one or more local interfaces 182, the one or more local peripherals 183, the at least one local processor 184, the one or more local databases 186, and the at least one local memory 187 communicatively coupled to one another. Further, the local memory 187 may comprise the local instructions 188 and one or more local tokens 189 assigned to a given managed server 110.

The managed servers 110 may be hardware configured to create, transmit, and/or receive information. The managed servers 110 may be configured as a provider node or as worker nodes. The managed servers 110 may be configured to receive inputs from a user, process the inputs, and generate data information or command information in response. The data information may include documents or files generated using a graphical user interface (GUI). The command information may include input selections/commands triggered by a user using a peripheral component or one or more local peripherals 183 (i.e., a keyboard) or an integrated input system (i.e., a touchscreen displaying the GUI). The managed servers 110 may be communicatively coupled to the admin server 102 via a network connection (i.e., the one or more local peripherals 183). The managed servers 110 may transmit and receive data information, command information, or a combination of both to and from the admin server 102 via the local interfaces 182. In one or more embodiments, the managed servers 110 are configured to exchange data, commands, and signaling with the admin server 102. In some embodiments, the managed servers 110 are configured to receive at least one firewall configuration from the admin server 102 to implement a firewall (one of the one or more local applications) at one of the managed servers 110.

In one or more embodiments, the local interfaces 182 may be any suitable hardware or software (e.g., executed by hardware) to facilitate any suitable type of communication in wireless or wired connections. These connections may comprise, but not be limited to, all or a portion of network connections coupled to additional managed servers 110, the admin server 102, the Internet, an Intranet, a private network, a public network, a peer-to-peer network, the public switched telephone network, a cellular network, a LAN, a MAN, a WAN, and a satellite network. The local interfaces 182 may be configured to support any suitable type of communication protocol.

In one or more embodiments, the one or more local peripherals 183 may comprise audio devices (e.g., speaker, microphones, and the like), input devices (e.g., keyboard, mouse, and the like), or any suitable electronic component that may provide a modifying or triggering input to the managed servers 110. For example, the one or more local peripherals 183 may be speakers configured to release audio signals (e.g., voice signals or commands) during media playback operations. In another example, the one or more local peripherals 183 may be microphones configured to capture audio signals. In one or more embodiments, the one or more local peripherals 183 may be configured to operate continuously, at predetermined time periods or intervals, or on-demand.

The local processor 184 may comprise one or more processors communicatively coupled to and in signal communication with the local interfaces 182, the one or more local peripherals 183, and the local memory 187. The local processor 184 is any electronic circuitry, including, but not limited to, state machines, one or more CPU chips, logic units, cores (e.g., a multi-core processor), FPGAs, ASICs, or DSPs. The local processor 184 may be a programmable logic device, a microcontroller, a microprocessor, or any suitable combination of the preceding. The one or more processors in the local processor 184 are configured to process data and may be implemented in hardware or software executed by hardware. For example, the local processor 184 may be an 8-bit, a 16-bit, a 32-bit, a 64-bit, or any other suitable architecture. The local processor 184 may comprise an ALU to perform arithmetic and logic operations, processor registers that supply operands to the ALU, and store the results of ALU operations, and a control unit that fetches software instructions such as local instructions 188 from the local memory 187 and executes the local instructions 188 by directing the coordinated operations of the ALU, registers, and other components via a device processing engine (not shown). The local processor 184 may be configured to execute various instructions.

The local memory 187 may comprise multiple operation data and one or more local applications associated with the managed server 110. The operation data may be data configured to enable one or more data processing operations such as those described in relation with the admin server 102. The operation data may be partially or completely different from those comprised in the server memory 130. The local applications may be one or more of the services described in relation with the admin server 102. In some embodiments, the local applications may be partially or completely different from those comprised in the server memory 130. The local instructions 188 may be configured to provide one or more instructions configured to trigger and/or guide operations in the managed server 110. In one or more embodiments, the local tokens 189 comprise one or more of the tokens 170 assigned to specific managed server 110.

Network

The network 114 facilitates communication between and amongst the various devices of the system 100. The network 114 may be any suitable network operable to facilitate communication between the admin server 102 and the managed servers 110 of the system 100. The network 114 may include any interconnecting system capable of transmitting audio, video, signals, data, data packets, messages, or any combination of the preceding. The network 114 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices. The network 114 may be a light-based network configured to provide communications using fiber optical cables and/or other infrastructure configured to transfer light.

Decentralized Network

In one or more embodiments, the decentralized networks 106 comprises a peer-to-peer networking protocol that enables development of serverless applications. The decentralized networks 106 may include multiple electronic components or devices (i.e., nodes 112) comprising specific node data. The nodes 112 may not be required to store or validate all data in the decentralized network 106. Instead, validation of each node's data may be obtained via peer accountability. The decentralized networks 106 may be a blockchain network configured to perform one or more decentralized operations.

In some embodiments, the nodes 112 may include only their own data and a reference to all other data in a given decentralized network 106 in accordance with rules and/or policies preestablished by an electronic component or device outside the given decentralized network 106 (e.g., one or more servers, such as the admin server 102). Each node may comprise one or more configuration parameters 190 and/or one or more data exchange controls 192. The configuration parameters 190 may determine how the nodes 112 interact with each other and the admin server 102. The configuration parameters 190 may be updated dynamically or periodically with additional data received as updates via one or more planning components (e.g., electronic devices or components configured to provide updates to the configuration parameters 190). The updates may be triggered by a perceived lack of knowledge level in the nodes 112. A perceived knowledge level in the nodes 112 may be identified via node scores (not shown) received from the admin server 102 as feedback.

In one or more embodiments, each node (i.e., out of nodes 112) in the given decentralized network 106 includes knowledge-specific information and information associated with peer accountability and a perceived knowledge level. Specifically, referencing the node 112*a* as a non-limiting example, includes configuration parameters 190*a* and data exchange controls 192*a*. The data exchange controls 192*a* may include information corresponding to at least one knowledge domain configured to perform interactions of one or more managed servers 110. In one or more embodiments, the node 112*a* may be configured to receive one or more of initial tokens. Upon receiving the tokens 170, the node 112*a* may be configured to determine whether any of entitlements 158 of the initial tokens correspond to the knowledge information included in the data exchange controls 192*a*.

In other embodiments, the node 112*a* includes a processor (not shown) configured to provide updates corresponding to specific updated data exchange controls 192*a*. The processor in the node 112*a* may be configured to provide updated tokens directly to the server processor 126. Further, the processor of the node 112*a* may be configured to route any initial tokens that are not updated to one of the other nodes 112 in accordance with one or more configuration parameters 190 governing the given decentralized network 106. The data exchange controls 192 at a given node 112 may be configured to generate a token 170 representative of a request 134 and perform a corresponding interaction in one or more of the decentralized networks 106. In some embodiments, the data exchange controls 192 may enable the token 170 to perform interactions between a first decentralized network 106 and a second decentralized network 106. Each of the decentralized networks 106 may comprise corresponding configuration information configured to interpret the requests 134 in the given token 170.

In the example of FIG. 1, a representation of the decentralized networks 106 includes five nodes 112*a*-112*e*. However, additional nodes or fewer nodes may be included. In some embodiments, each of the nodes 112 includes corresponding configuration parameters 190 and corresponding data exchange controls 192. In the decentralized networks 106 of FIG. 1, the node 112*a* includes the configuration parameters 190*a* and the updated data exchange controls 192*a*; the node 112*b* includes the configuration parameters 190*b* and the updated data exchange controls 192*b*; the node 112*c* includes the configuration parameters 190*c* and the updated data exchange controls 192*c*; the node 112*d* includes the configuration parameters 190*d* and the updated data exchange controls 192*d*; and the node 112*e* includes the configuration parameters 190*e* and the updated data exchange controls 192*e*.

Operational Flow

In one or more embodiments, the admin server 102 and/or managed servers 110 are endpoints (e.g., ATM, user device) configured to share access to network resources using one or more data exchange operations 104. In some embodiments, the admin server 102 is configured to evaluate and fulfill requests 134 received from communication systems 119 outside a network 114. Herein, outside the network 114 refers to endpoints and/or terminals that are not configured to access the network 114 freely and/or without requesting use of infrastructure elements in the network 114, and/or are associated with one or more requesting networks 118.

In one or more embodiments, one or more applications (e.g., internet-of-things (IOT) applications and/or web applications in the communication systems 119) may be configured to generate a request 134 to access one or more infrastructure elements in the network 114. For example, the requests 134 may ask to offload one or more data exchange operations 104 from the requesting networks 118 to one or more of the managed servers 110.

In some embodiments, the communication systems 119 may be configured to transmit a request 134 to one or more interfaces in the admin server 102. The admin server 102 may be configured to register the request 134 with reasons under a system profile 156. Further, the admin server 102 may be configured to read the request 134 and categorize layers of sub-requests under the request 134 based on dimensions and/or consent registrations 136 associated with the communication system 119. The admin server 102 may be configured to request a multi-dimensional token (e.g., tokens 170) request for one or more decentralized networks 106 to create a multi-dimension token based on the sub-requests for the system profile 156.

In one or more embodiments, the admin server 102 may be configured to use a trained artificial intelligence algorithm 162 to match the tokens 170 to sub-requests based on dimensions generated to match communication levels 138. The admin server 102 may be configured to mark the matched sub-requests with a digital tag (e.g., tag 148) temporarily such that same requests 134 and/or sub-requests may not be considered while the digital tag. At this stage, the admin server 102 may be configured to use a trained artificial intelligence algorithm to execute an explainable artificial intelligence protocol configured to explain reasons for match based on dimensions and consent. The admin server 102 may be configured to generate an operational mesh 140 configured to provide access between one or more infrastructure elements and the communication system 119.

The admin server 102 may be configured to provide tokens specific to each software application in the operational mesh 140 configured to verify that a given communication system 119 is allowed to exchange data with specific infrastructure elements in the network 114. The admin server 102 may be configured to validate the token 170 at the run time and activate/deactivate access to each resource node 146 in the operational mesh 140.

In one or more embodiments, the admin server 102 may be configured to determine, create, generate, and/or select a multi-dimensional token representative of one or more possible modifications of starting data as the starting data transitions between one or more operation points and/or sub-operations 144 in a specific operational mesh 140. The admin server 102 may be configured to execute the artificial intelligence algorithm 162 along with one or more artificial intelligence commands 164 to create, generate, assign, and/or select a multi-dimensional token for data used in the data exchange operation 104 (e.g., a data exchange operation 104 may comprise multiple records and/or a record may comprise one or more multiple data elements). The admin server 102 may be configured to define rules and/or policies setting a time duration, probability of change and/or modifications of data over the operational mesh 140. The multi-dimensional token may be configured to maintain information relating to changes of the data as the data changes over the operational mesh 140. The multi-dimensional tokens may comprise one or more evaluation levels. The evaluation levels 138 may be specific to one or more operations, records, and/or data fields. The evaluation levels 138 may comprise operation-specific levels, record-specific levels, and/or data element-specific levels. The operation-specific levels 138 may comprise tracking data changes at an operation level as sub-operations 144 modify the data. The record-specific levels 138 may comprise tracking of records in a data exchange operation 104 as there may be multiple records in a single transaction. The data element-specific levels 138 may comprise tracking of data elements as the data exchange operation 104 flows in the operational mesh 140.

In one or more embodiments, the admin server 102 uses multi-dimensional tokens at multiple levels to track a dynamic nature of starting and/or operational data, such as data transformation, data enrichment, data conformation according to application schemas, and the like. The admin server 102 may be configured to update the multi-dimensional tokens with the aid of the decentralized networks 106.

In one or more embodiments, the one or more modifications may be recommendations presented to the managed servers 110 based on the one or more of the sub-operations 144 performed in the operational mesh 140. The modifications may comprise one or more dynamic configuration commands to modify the one or more entitlements 158, the one or more tokens 170, and/or the one or more configuration parameters 168. In one or more embodiments, the dynamic configuration commands may comprise the one or more application configuration parameters configured to control operations of the services and/or the local applications. Each configuration command of the application configuration parameters may be configured to dynamically provide control information to perform one or more of the operations based at least in part upon the analyzed data during the operational mesh 140. The modifications may provide preventive solutions to remove, reduce, and/or eliminate anomalies as a data exchange operation 104 is completed. In any integrated system where multiple applications (e.g., services) interact with each other, the system 100 may thoroughly perform impact checks of any changes to operations and whether modifications are needed to ensure any change in data is not impacting performance of the services.

In one or more embodiments, one or more anomaly detection operations may comprise one or more operations executed in conjunction with the one or more operations of the artificial intelligence algorithms 162. The one or more anomaly detection operations may be configured to evaluate data exchanged between the managed servers 110 and/or the admin server 102. In one or more embodiments, the anomaly detection operations may be configured to evaluate the mesh durations 142, the sub-operations 144, and/or the resource nodes 146 for a specific operational mesh 140. The anomaly detection operations may be configured to generate and analyze one or more communication operations to confirm whether one or more entities associated with communication operations are legitimately associated with at least one of the managed servers 110. The anomaly detection operations may be one or more operations in which the admin server 102 is configured to confirm whether one or more communication operations associated with a specific entity belong to a specific managed server 110. In some embodiments, the anomaly detection operations may be configured to determine one or more anomalies in data changes and/or modifications as data is modified in a given operational mesh 140. The one or more anomalies may be one or more values configured to provide indicators of possible adverse changes to the network 114, the admin server 102, and/or one or more services. The anomalies may be determined as results of evaluating modifications (e.g., changes) to the starting data and/or one or more data elements and/or record elements along a given operational mesh 140. The anomalies may be determined after evaluating one or more changes in the tokens 170.

Example Process to Orchestrate Access to Communication Infrastructure

FIG. 2 illustrates an example flowchart of a process 200 configured to orchestrate access to communication infrastructure in a local network (network 114), in accordance with one or more embodiments. Modifications, additions, or omissions may be made to the process 200. The process 200 may comprise more, fewer, or other operations than those shown in FIG. 2. For example, operations may be performed in parallel or in any suitable order. While at times discussed as the admin server 102, the managed servers 110, the nodes 112, or components of any of thereof performing operations described in operations 202-232 in the process 200, any suitable system or components of the system 100 may perform one or more operations of the process 200. For example, one or more operations of the process 200 may be implemented, at least in part, in the form of instructions 132 of FIG. 1, stored on non-transitory, tangible, machine-readable media (e.g., a non-transitory computer-readable medium such as server memory 130 of FIG. 1) that when run by one or more processors (e.g., the server processor 126 of FIG. 1) may cause the one or more processors to perform operations described in operations 202-232.

The process 200 starts at operation 202, where the admin server 102 is configured to receive a request 134 to perform a data exchange operation 104 with a communication system 119 at a communication level 138. At operation 204, the admin server 102 is configured to determine configuration parameters 190 based on the data exchange operation 104. The admin server 102 may be configured to determine multiple configuration parameters 190 based on the data exchange operation 104. The configuration parameters 190 may comprise guidance to perform the data exchange operation 104. At operation 206, the admin server 102 is configured to transmit the configuration parameters 190 to a decentralized network 106 configured to create a multi-dimension token (e.g., token 170) comprising configuration information 172 corresponding to a configuration parameter 190 of the configuration parameters 190. At operation 208, the admin server 102 is configured to receive the multi-dimension token from the decentralized network 106. At operation 210, the admin server 102 is configured to train, in a first stage (e.g., at a training stage 176), an artificial intelligence algorithm 162 using input data 147 comprising a system profile 156 comprising entitlements 158 associated with the communication system 119, previous data exchange operations 104 performed by the communication system 119, and infrastructure status information representing availability of resource nodes 146 in a communication layer. At operation 212, the admin server 102 is configured to match, using the artificial intelligence algorithm 162, the communication level 138 to the configuration information 172. At operation 214, the admin server 102 is configured to attach, using the artificial intelligence algorithm 162, a tag 148 to the request 134 referencing that the communication level 138 is matched to the configuration information 172. In response to matching the communication level 138 to the configuration information 172, the admin server 102 is configured to attach, using the trained artificial intelligence algorithm 162, the tag 148 to the request 134.

Further, at operation 216, the admin server 102 is configured to generate, using the trained artificial intelligence algorithm 162, an operational mesh 140 to complete the data exchange operation 104 over a mesh duration 142 based on the configuration information 172. In response to attaching the tag 148 to the request 134, the admin server 102 is configured to generate, using the trained artificial intelligence algorithm, the operational mesh 140 to complete the data exchange operation 104 over the mesh duration 142 based on the configuration information 172. The data exchange operation 104 may comprise a first sub-operation 144 and a second sub-operation 144. The operational mesh 140 may comprise a first resource node 146 in the communication layer configured to perform the first sub-operation 144. The operational mesh 140 may comprise a second resource node 146 in the communication layer configured to perform the second sub-operation 144. In some embodiments, the admin server 102 may be configured to assign an access token (e.g., token 170) to the data exchange operation 104 based on the communication level 138. The access token may reference the first sub-operation 144 and the second sub-operation 144 to be performed on the operational mesh 140 over the mesh duration 142. At operation 218, the admin server 102 is configured to perform the data exchange operation 104 using the operational mesh 140 during the mesh duration 142.

At operation 220, the admin server 102 is configured to determine whether the data exchange operation 104 is performed within the mesh duration 142. If the admin server 102 determines that the data exchange operation 104 is not performed within the mesh duration 142 (e.g., NO), the process 200 proceeds to operation 222. If the admin server 102 determines that the data exchange operation 104 is performed within the mesh duration 142 (e.g., YES), the process 200 proceeds to operation 232.

The process 200 may end at operation 222, where the admin server 102 may be configured to train, in a second stage, the artificial intelligence algorithm 162 using second input data 147 comprising the system profile 156, the previous data exchange operations 104 performed by the communication system 119, infrastructure status information, and the operational mesh 140 in a positive feedback loop 150. In response to determining that the data exchange operation 104 is performed within the mesh duration 142, the admin server 102 is configured to train, in the second stage, the artificial intelligence algorithm 162.

The process 200 may end at operation 232, where the admin server 102 may be configured to train, in the second stage, the artificial intelligence algorithm 162 using second input data 147 comprising the system profile 156, the previous data exchange operations 104 performed by the communication system 119, infrastructure status information, and the operational mesh 140 in a negative feedback loop 150. In response to determining that the data exchange operation 104 is performed within the mesh duration 142, the admin server 102 is configured to train, in the second stage, the artificial intelligence algorithm 162.

In one or more embodiments, in conjunction with receiving the request 134 to perform the data exchange operation 104 with the communication system 119 at the first communication level 138, the admin server 102 is configured to receive a registration request from the communication system 119. The registration request may be configured to request approval to create the system profile 156. The admin server 102 may be configured to determine whether the communication system 119 is associated with an allowed communication system 119 in a trusted system repository 178, and create the system profile 156 in response to determining that the communication system 119 is associated with the allowed communication system in the trusted system repository 178. The admin server 102 may be configured to generate an approval command (e.g., access command 180) referencing that the communication system 119 is allowed to request infrastructure access to the communication layer and transmit the approval command to the communication system 119. Further, the admin server 102 may be configured to generate a denial command referencing that the communication system 119 is not allowed to request infrastructure access to the communication layer and transmit the denial command to the communication system 119. The infrastructure status information may be updated periodically over time.

In one or more embodiments, the admin server 102 may be configured to update the infrastructure status information to account for use of the first resource node 146 to perform the first sub-operation 144 and the second resource node 146 to perform the second sub-operation 144 over the mesh duration 142 in conjunction with generating the operational mesh 140 to complete the data exchange operation 104 over the first mesh duration 142 based on the configuration information 172. In conjunction with performing the data exchange operation 104 using the operational mesh 140 during the mesh duration 142, the admin server 102 may be configured to receive an additional request 134 to perform an additional data exchange operation 104 with the communication system 119 at an additional communication level 138. The admin server 102 may be configured to, in conjunction with determining that the data exchange operation 104 is performed within the mesh duration 142, remove the tag 148 referencing that the communication level 138 is matched to the configuration information 172.

SCOPE OF THE DISCLOSURE

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. An apparatus, comprising:
- a memory operable to store:
  - a system profile comprising a plurality of entitlements associated with a communication system; and
  - infrastructure status information representing availability of a plurality of resource nodes in a communication layer in the apparatus; and
- at least one processor communicatively coupled to the memory and configured to:
  - receive a first request to perform a first data exchange operation with the communication system at a first communication level;
  - determine a first plurality of configuration parameters based on the first data exchange operation, the first plurality of configuration parameters comprising first guidance to perform the first data exchange operation;
  - transmit the first plurality of configuration parameters to a decentralized network configured to create a first multi-dimension token comprising first configuration information corresponding to a first configuration parameter of the first plurality of configuration parameters;

receive the first multi-dimension token from the decentralized network;

train, in a first stage, an artificial intelligence algorithm using first input data comprising the system profile, a plurality of previous data exchange operations performed by the communication system, and the infrastructure status information;

match, using the artificial intelligence algorithm, the first communication level to the first configuration information;

in response to matching the first communication level to the first configuration information, attach, using the artificial intelligence algorithm, a tag to the first request referencing that the first communication level is matched to the first configuration information;

in response to attaching the tag to the first request, generate, using the artificial intelligence algorithm, a first operational mesh to complete the first data exchange operation over a first mesh duration based on the first configuration information, wherein:

the first data exchange operation comprises a first sub-operation and a second sub-operation;

the first operational mesh comprises a first resource node in the communication layer configured to perform the first sub-operation; and the first operational mesh comprises a second resource node in the communication layer configured to perform the second sub-operation;

assign a first access token to the first data exchange operation based on the first communication level, the first access token referencing the first sub-operation and the second sub-operation to be performed on the first operational mesh over the first mesh duration;

perform the first data exchange operation using the first operational mesh during the first mesh duration;

determine whether the first data exchange operation is performed within the first mesh duration;

in response to determining that the first data exchange operation is performed within the first mesh duration, train, in a second stage, the artificial intelligence algorithm using second input data comprising the system profile, the plurality of previous data exchange operations performed by the communication system, the infrastructure status information; and the first operational mesh in a positive feedback loop; and in response to determining that the first data exchange operation is performed within the first mesh duration, train, in the second stage, the artificial intelligence algorithm using third input data comprising the system profile, the plurality of previous data exchange operations performed by the communication system, the infrastructure status information; and the first operational mesh in a negative feedback loop.

2. The apparatus of claim 1, wherein the at least one processor is further configured to:

in conjunction with receiving the first request to perform the first data exchange operation with the communication system at the first communication level, receive a registration request from the communication system, the registration request requesting approval to create the system profile;

determine whether the communication system is associated with an allowed communication system in a trusted system repository;

in response to determining that the communication system is associated with the allowed communication system in the trusted system repository, create the system profile;

generate an approval command referencing that the communication system is allowed to request infrastructure access to the communication layer; and transmit the approval command to the communication system.

3. The apparatus of claim 1, wherein the at least one processor is further configured to:

in conjunction with receiving the first request to perform the first data exchange operation with the communication system at the first communication level, receive a registration request from the communication system, the registration request requesting approval to create the system profile;

determine whether the communication system is associated with an allowed communication system in a trusted system repository;

in response to determining that the communication system is not associated with the allowed communication system in the trusted system repository, generate a denial command referencing that the communication system is not allowed to request infrastructure access to the communication layer; and transmit the denial command to the communication system.

4. The apparatus of claim 1, wherein the infrastructure status information is updated periodically over time.

5. The apparatus of claim 1, wherein the at least one processor is further configured to:

in conjunction with generating the first operational mesh to complete the first data exchange operation over the first mesh duration based on the first configuration information, update the infrastructure status information to account for use of the first resource node to perform the first sub-operation and the second resource node to perform the second sub-operation over the first mesh duration.

6. The apparatus of claim 1, wherein the at least one processor is further configured to:

in conjunction with performing the first data exchange operation using the first operational mesh during the first mesh duration, receive a second request to perform a second data exchange operation with the communication system at a second communication level;

determine a second plurality of configuration parameters based on the second data exchange operation, the second plurality of configuration parameters comprising second guidance to perform the second data exchange operation;

transmit the second plurality of configuration parameters to the decentralized network configured to create a second multi-dimension token comprising a plurality of dimensional parameters, wherein:

the plurality of dimensional parameters comprises a first dimensional parameter comprising the first configuration information corresponding to the first configuration parameter of the first plurality of configuration parameters; and the plurality of dimensional parameters comprises a second dimensional parameter comprising second configuration information corresponding to a second configuration parameter of the second plurality of configuration parameters;

receive the second multi-dimension token from the decentralized network;

determine, using the artificial intelligence algorithm, that the first configuration information is previously matched to the first communication level;

match, using the artificial intelligence algorithm, the second communication level to the second configuration information;

in response to matching the first communication level to the first configuration information, determine whether the first configuration information is associated with the communication system;

in response to determining that the first configuration information is associated with the communication system, determine whether the second configuration information is associated with the communication system;

in response to determining that the second configuration information is not associated with the communication system, attach, using the artificial intelligence algorithm, an additional tag to the second request referencing that the second communication level is matched to the second configuration information;

generate, using the artificial intelligence algorithm, a second operational mesh to complete the second data exchange operation over a second mesh duration based on the second configuration information, wherein:

the second data exchange operation comprises a third sub-operation, a fourth sub-operation, and a fifth sub-operation;

the second operational mesh comprises a third resource node in the communication layer configured to perform the third sub-operation;

the second operational mesh comprises a fourth resource node in the communication layer configured to perform the fourth sub-operation; and the second operational mesh comprises a fifth resource node in the communication layer configured to perform the fifth sub-operation;

assign a second access token to the second data exchange operation based on the second communication level, the second access token referencing the third sub-operation, the fourth sub-operation, and the fifth sub-operation to be performed on the second operational mesh over the second mesh duration; and perform the second data exchange operation using the second operational mesh during the first mesh duration.

7. The apparatus of claim 1, wherein the at least one processor is further configured to:

in conjunction with determining that the first data exchange operation is performed within the first mesh duration, remove the tag the first request referencing that the first communication level is matched to the first configuration information.

8. A method, comprising:

receiving a first request to perform a first data exchange operation with a communication system at a first communication level;

determining a first plurality of configuration parameters based on the first data exchange operation, the first plurality of configuration parameters comprising first guidance to perform the first data exchange operation;

transmitting the first plurality of configuration parameters to a decentralized network configured to create a first multi-dimension token comprising first configuration information corresponding to a first configuration parameter of the first plurality of configuration parameters;

receiving the first multi-dimension token from the decentralized network;

training, in a first stage, an artificial intelligence algorithm using first input data comprising a system profile comprising a plurality of entitlements associated with a communication system, a plurality of previous data exchange operations performed by the communication system, and infrastructure status information representing availability of a plurality of resource nodes in a communication layer;

matching, using the artificial intelligence algorithm, the first communication level to the first configuration information;

in response to matching the first communication level to the first configuration information, attaching, using the artificial intelligence algorithm, a tag to the first request referencing that the first communication level is matched to the first configuration information;

in response to attaching the tag to the first request, generating, using the artificial intelligence algorithm, a first operational mesh to complete the first data exchange operation over a first mesh duration based on the first configuration information, wherein:

the first data exchange operation comprises a first sub-operation and a second sub-operation;

the first operational mesh comprises a first resource node in the communication layer configured to perform the first sub-operation; and the first operational mesh comprises a second resource node in the communication layer configured to perform the second sub-operation;

assigning a first access token to the first data exchange operation based on the first communication level, the first access token referencing the first sub-operation and the second sub-operation to be performed on the first operational mesh over the first mesh duration;

performing the first data exchange operation using the first operational mesh during the first mesh duration;

determining whether the first data exchange operation is performed within the first mesh duration;

in response to determining that the first data exchange operation is performed within the first mesh duration, training, in a second stage, the artificial intelligence algorithm using second input data comprising the system profile, the plurality of previous data exchange operations performed by the communication system, the infrastructure status information; and the first operational mesh in a positive feedback loop; and in response to determining that the first data exchange operation is performed within the first mesh duration, training, in the second stage, the artificial intelligence algorithm using third input data comprising the system profile, the plurality of previous data exchange operations performed by the communication system, the infrastructure status information; and the first operational mesh in a negative feedback loop.

9. The method of claim 8, further comprising:

in conjunction with receiving the first request to perform the first data exchange operation with the communication system at the first communication level, receiving a registration request from the communication system, the registration request requesting approval to create the system profile;

determining whether the communication system is associated with an allowed communication system in a trusted system repository;

in response to determining that the communication system is associated with the allowed communication system in the trusted system repository, creating the system profile;

generating an approval command referencing that the communication system is allowed to request infrastructure access to the communication layer; and transmitting the approval command to the communication system.

10. The method of claim 8, further comprising:

in conjunction with receiving the first request to perform the first data exchange operation with the communication system at the first communication level, receiving a registration request from the communication system, the registration request requesting approval to create the system profile;

determining whether the communication system is associated with an allowed communication system in a trusted system repository;

in response to determining that the communication system is not associated with the allowed communication system in the trusted system repository, generating a denial command referencing that the communication system is not allowed to request infrastructure access to the communication layer; and transmitting the denial command to the communication system.

11. The method of claim 8, wherein the infrastructure status information is updated periodically over time.

12. The method of claim 8, further comprising:

in conjunction with generating the first operational mesh to complete the first data exchange operation over the first mesh duration based on the first configuration information, updating the infrastructure status information to account for use of the first resource node to perform the first sub-operation and the second resource node to perform the second sub-operation over the first mesh duration.

13. The method of claim 8, further comprising:

in conjunction with performing the first data exchange operation using the first operational mesh during the first mesh duration, receiving a second request to perform a second data exchange operation with the communication system at a second communication level;

determining a second plurality of configuration parameters based on the second data exchange operation, the second plurality of configuration parameters comprising second guidance to perform the second data exchange operation;

transmitting the second plurality of configuration parameters to the decentralized network configured to create a second multi-dimension token comprising a plurality of dimensional parameters, wherein:

the plurality of dimensional parameters comprises a first dimensional parameter comprising the first configuration information corresponding to the first configuration parameter of the first plurality of configuration parameters; and the plurality of dimensional parameters comprises a second dimensional parameter comprising second configuration information corresponding to a second configuration parameter of the second plurality of configuration parameters;

receive the second multi-dimension token from the decentralized network;

determining, using the artificial intelligence algorithm, that the first configuration information is previously matched to the first communication level;

matching, using the artificial intelligence algorithm, the second communication level to the second configuration information;

in response to matching the first communication level to the first configuration information, determining whether the first configuration information is associated with the communication system;

in response to determining that the first configuration information is associated with the communication system, determining whether the second configuration information is associated with the communication system;

in response to determining that the second configuration information is not associated with the communication system, attaching, using the artificial intelligence algorithm, an additional tag to the second request referencing that the second communication level is matched to the second configuration information;

generating, using the artificial intelligence algorithm, a second operational mesh to complete the second data exchange operation over a second mesh duration based on the second configuration information, wherein:

the second data exchange operation comprises a third sub-operation, a fourth sub-operation, and a fifth sub-operation;

the second operational mesh comprises a third resource node in the communication layer configured to perform the third sub-operation;

the second operational mesh comprises a fourth resource node in the communication layer configured to perform the fourth sub-operation; and the second operational mesh comprises a fifth resource node in the communication layer configured to perform the fifth sub-operation;

assigning a second access token to the second data exchange operation based on the second communication level, the second access token referencing the third sub-operation, the fourth sub-operation, and the fifth sub-operation to be performed on the second operational mesh over the second mesh duration; and performing the second data exchange operation using the second operational mesh during the first mesh duration.

14. The method of claim 8, further comprising:

in conjunction with determining that the first data exchange operation is performed within the first mesh duration, removing the tag the first request referencing that the first communication level is matched to the first configuration information.

15. A non-transitory computer-readable medium storing instructions that when executed by a processor cause the processor to:

receive a first request to perform a first data exchange operation with a communication system at a first communication level;

determine a first plurality of configuration parameters based on the first data exchange operation, the first plurality of configuration parameters comprising first guidance to perform the first data exchange operation;

transmit the first plurality of configuration parameters to a decentralized network configured to create a first multi-dimension token comprising first configuration information corresponding to a first configuration parameter of the first plurality of configuration parameters;

receive the first multi-dimension token from the decentralized network;

train, in a first stage, an artificial intelligence algorithm using first input data comprising a system profile comprising a plurality of entitlements associated with a communication system, a plurality of previous data exchange operations performed by the communication system, and infrastructure status information representing availability of a plurality of resource nodes in a communication layer;

match, using the artificial intelligence algorithm, the first communication level to the first configuration information;

in response to matching the first communication level to the first configuration information, attach, using the artificial intelligence algorithm, a tag to the first request referencing that the first communication level is matched to the first configuration information;

in response to attaching the tag to the first request, generate, using the artificial intelligence algorithm, a first operational mesh to complete the first data exchange operation over a first mesh duration based on the first configuration information, wherein:

the first data exchange operation comprises a first sub-operation and a second sub-operation;

the first operational mesh comprises a first resource node in the communication layer configured to perform the first sub-operation; and the first operational mesh comprises a second resource node in the communication layer configured to perform the second sub-operation;

assign a first access token to the first data exchange operation based on the first communication level, the first access token referencing the first sub-operation and the second sub-operation to be performed on the first operational mesh over the first mesh duration;

perform the first data exchange operation using the first operational mesh during the first mesh duration;

determine whether the first data exchange operation is performed within the first mesh duration;

in response to determining that the first data exchange operation is performed within the first mesh duration, train, in a second stage, the artificial intelligence algorithm using second input data comprising the system profile, the plurality of previous data exchange operations performed by the communication system, the infrastructure status information; and the first operational mesh in a positive feedback loop; and in response to determining that the first data exchange operation is performed within the first mesh duration, train, in the second stage, the artificial intelligence algorithm using third input data comprising the system profile, the plurality of previous data exchange operations performed by the communication system, the infrastructure status information; and the first operational mesh in a negative feedback loop.

16. The non-transitory computer-readable medium of claim 15, wherein, when executed by the processor, the instructions further cause the processor to:

in conjunction with receiving the first request to perform the first data exchange operation with the communication system at the first communication level, receive a registration request from the communication system, the registration request requesting approval to create the system profile;

determine whether the communication system is associated with an allowed communication system in a trusted system repository;

in response to determining that the communication system is associated with the allowed communication system in the trusted system repository, create the system profile;

generate an approval command referencing that the communication system is allowed to request infrastructure access to the communication layer; and transmit the approval command to the communication system.

17. The non-transitory computer-readable medium of claim 15, wherein, when executed by the processor, the instructions further cause the processor to:

in conjunction with receiving the first request to perform the first data exchange operation with the communication system at the first communication level, receive a registration request from the communication system, the registration request requesting approval to create the system profile;

determine whether the communication system is associated with an allowed communication system in a trusted system repository;

in response to determining that the communication system is not associated with the allowed communication system in the trusted system repository, generate a denial command referencing that the communication system is not allowed to request infrastructure access to the communication layer; and transmit the denial command to the communication system.

18. The non-transitory computer-readable medium of claim 15, wherein the infrastructure status information is updated periodically over time.

19. The non-transitory computer-readable medium of claim 15, wherein, when executed by the processor, the instructions further cause the processor to:

in conjunction with generating the first operational mesh to complete the first data exchange operation over the first mesh duration based on the first configuration information, update the infrastructure status information to account for use of the first resource node to perform the first sub-operation and the second resource node to perform the second sub-operation over the first mesh duration.

20. The non-transitory computer-readable medium of claim 15, wherein, when executed by the processor, the instructions further cause the processor to:

in conjunction with performing the first data exchange operation using the first operational mesh during the first mesh duration, receive a second request to perform a second data exchange operation with the communication system at a second communication level;

determine a second plurality of configuration parameters based on the second data exchange operation, the second plurality of configuration parameters comprising second guidance to perform the second data exchange operation;

transmit the second plurality of configuration parameters to the decentralized network configured to create a second multi-dimension token comprising a plurality of dimensional parameters, wherein:

the plurality of dimensional parameters comprises a first dimensional parameter comprising the first configuration information corresponding to the first configuration parameter of the first plurality of configuration parameters; and the plurality of dimensional parameters comprises a second dimensional parameter comprising second configuration information corresponding to a second configuration parameter of the second plurality of configuration parameters;

receive the second multi-dimension token from the decentralized network;

determine, using the artificial intelligence algorithm, that the first configuration information is previously matched to the first communication level;

match, using the artificial intelligence algorithm, the second communication level to the second configuration information;

in response to matching the first communication level to the first configuration information, determine whether the first configuration information is associated with the communication system;

in response to determining that the first configuration information is associated with the communication system, determine whether the second configuration information is associated with the communication system;

in response to determining that the second configuration information is not associated with the communication system, attach, using the artificial intelligence algorithm, an additional tag to the second request referencing that the second communication level is matched to the second configuration information;

generate, using the artificial intelligence algorithm, a second operational mesh to complete the second data exchange operation over a second mesh duration based on the second configuration information, wherein:

the second data exchange operation comprises a third sub-operation, a fourth sub-operation, and a fifth sub-operation;

the second operational mesh comprises a third resource node in the communication layer configured to perform the third sub-operation;

the second operational mesh comprises a fourth resource node in the communication layer configured to perform the fourth sub-operation; and the second operational mesh comprises a fifth resource node in the communication layer configured to perform the fifth sub-operation;

assign a second access token to the second data exchange operation based on the second communication level, the second access token referencing the third sub-operation, the fourth sub-operation, and the fifth sub-operation to be performed on the second operational mesh over the second mesh duration; and perform the second data exchange operation using the second operational mesh during the first mesh duration.

* * * * *